No. 882,390. PATENTED MAR. 17, 1908.
A. JOHNSON.
COUPLING.
APPLICATION FILED MAY 25, 1907.

Inventor
Alfred Johnson

Witnesses
Hugh H. Ott.
Geo. Ackman Jr.

By Victor J. Evans
Attorney

UNITED STATES PATENT OFFICE.

ALFRED JOHNSON, OF QUINCY, ILLINOIS.

COUPLING.

No 882,390.  Specification of Letters Patent.  Patented March 17, 1908.

Application filed May 25, 1907. Serial No. 375,658.

*To all whom it may concern:*

Be it known that I, ALFRED JOHNSON, a citizen of the United States of America, residing at Quincy, in the county of Adams and State of Illinois, have invented new and useful Improvements in Couplings, of which the following is a specification.

The invention relates to an improvement in couplings, and particularly to a rope coupling constructed to automatically secure the rope in place in securing the coupling parts together.

The main object of the present invention is the provision of a coupling consisting essentially in two parts, one of the parts being designed to receive the rope end and the other to provide a means whereby the coupling as an entirety may be connected to a second coupling or to an independent element, the construction providing that in the connection of these parts to complete the coupling the rope end will be securely held in place.

Figure 1:
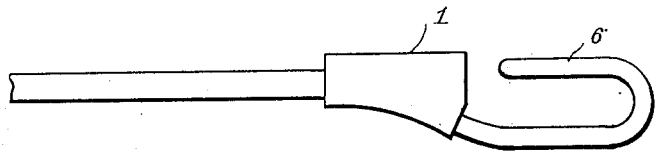
Figure 2:
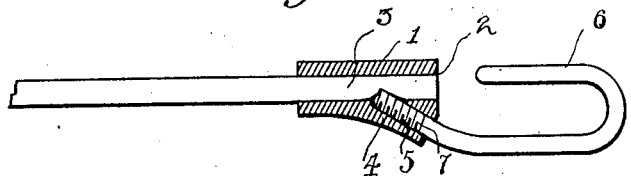
Figure 3:
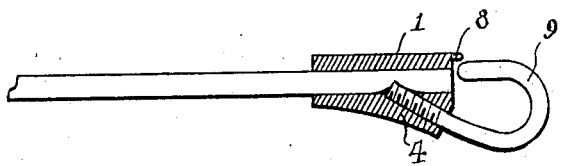

The invention in the preferred form will be described in the following specification, reference being had to the accompanying drawings, in which:

Figure 1 is a view in side elevation showing my coupling and a rope end secured therein. Fig. 2 is a similar view with the coupling sleeve in longitudinal section. Fig. 3 is a view similar to Fig. 2, showing a slightly modified form of coupling.

Referring particularly to Figs. 1 and 2 of the drawings, wherein is shown the preferred form of the invention, my improved coupling comprises a body 1, practically in sleeve form, the longitudinal bore 2 of which extends throughout the length of the body and is of a size to receive the rope end 3. At one portion of the surface the body is materially thickened to provide an offset portion 4, in which is formed a threaded bore or opening 5. The bore 5 is preferably disposed at an angle to the rope bore 2, and is in communication with the latter about mid length the body. The remaining member of the coupling comprises a single length of material, terminally bent at one end to provide a hook 6, the opposite end being threaded to provide a shank 7 adapted for threaded engagement with the bore 5. The shank 7 is preferably disposed at an angle to the main length of the hook so that when the shank is seated in the bore 5, the free end of the hook will be disposed practically in alinement with the rope bore.

In assembling the parts the rope end 3 is inserted in the bore 2 of the body until the extreme end of the rope is alined with the relatively forward edge of the body. In this position the shank 7 of the hook is screwed into the bore 5 until the relatively free end of the shank bites into the rope end, as shown in Fig. 2. The shank of the hook will therefore engage the rope end with the effect to prevent withdrawal of the rope from the body, thereby firmly securing the rope and coupling together without other fastening means.

In Fig. 3 is illustrated a slightly modified form of the invention in which the body 1 at a position diametrically opposed to the thickened portion 4 is formed with a forwardly projecting lip 8, and the hook 9 is so arranged that the free end thereof terminates in close proximity to the lip 8 to prevent accidental disengagement of the coupling from the fixture or other element with which it is connected.

In connection with the construction described it is to be particularly noted that the bore of the body 1 extends entirely through said body, permitting the body to be adjusted lengthwise of the rope to the desired point of adjustment before severing the rope beyond the body, and furthermore, and of importance is the fact that the shank 7 of the hook member enters into the rope with a shearing or cutting action, due primarily to the fact that a small portion only of the peripheral edge of the end of the shank inwardly contacts with the rope, thereby as the shank is revolved cutting its way into the rope until the desired depth is secured.

By the above invention it will be noted that I have provided a coupling consisting of two parts adapted to be manually assembled, which parts are so constructed and arranged that in their assembling they will automatically secure and bind the rope in the coupling. It is of course understood that the relative sizes of the parts and materials of which they are composed form no material part of the present invention, as I contemplate their construction of such size and of such material as may be rendered necessary by the purpose for which the particular coupling is designed.

Having thus described the invention, what I claim is:

1. A rope coupling comprising a body formed with a longitudinally disposed bore, said body being formed with a threaded bore arranged at an angle to an opening in the longitudinal bore, and a hook threaded for engagement with the threaded bore and adapted to be arranged with its threaded end projecting into said longitudinal bore, the angular arrangement of the threaded bore relative to the longitudinal bore serving to introduce the hook terminal into the longitudinal bore so that the transverse and longitudinal plane of said terminal are both at an angle to the longitudinal plane of the bore.

2. A rope coupling comprising a body formed with a longitudinally disposed bore, said body being formed with a threaded bore arranged at an angle to an opening in the longitudinal bore, and a hook threaded for engagement with the threaded bore and adapted to be arranged with its threaded end projecting into said longitudinal bore, the bill of the hook being disposed in alinement with the body, the angular arrangement of the threaded bore relative to the longitudinal bore serving to introduce the hook terminal into the longitudinal bore so that the transverse and longitudinal plane of said terminal are both at an angle to the longitudinal plane of the bore.

3. A rope coupling comprising a body formed with a longitudinally disposed bore, said body being formed with a threaded bore arranged at an angle to an opening in the longitudinal bore, and a hook threaded for engagement with the threaded bore and adapted to be arranged with its threaded end projecting into said longitudinal bore, the bill of the hook being disposed in alinement with the bore in the body, whereby the adjacent end of said body forms a guard for the hook, the angular arrangement of the threaded bore relative to the longitudinal bore serving to introduce the hook terminal into the longitudinal bore so that the transverse and longitudinal plane of said terminal are both at an angle to the longitudinal plane of the bore.

In testimony whereof, I affix my signature in presence of two witnesses.

ALFRED JOHNSON.

Witnesses:
   EDWARD P. ALLEN,
   M. L. WINDMAYER.